United States Patent
Iyer (10) Patent No.: US 11,157,423 B2
(45) Date of Patent: Oct. 26, 2021

(54) PIPELINED-DATA-TRANSFORM-ENABLED DATA MOVER SYSTEM

(71) Applicant: Dell Products L.P., Round Rock, TX (US)

(72) Inventor: Shyamkumar T. Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/401,913

(22) Filed: May 2, 2019

(65) Prior Publication Data

US 2020/0349095 A1 Nov. 5, 2020

(51) Int. Cl.
| | |
|---|---|
| *G06F 13/12* | (2006.01) |
| *G06F 13/16* | (2006.01) |
| *G06F 3/06* | (2006.01) |
| *G06F 21/60* | (2013.01) |

(52) U.S. Cl.
CPC ........ *G06F 13/1668* (2013.01); *G06F 3/0604* (2013.01); *G06F 3/0659* (2013.01); *G06F 3/0673* (2013.01); *G06F 21/602* (2013.01)

(58) Field of Classification Search
USPC .................. 710/5, 6, 68; 708/233; 345/506; 382/303
See application file for complete search history.

(56) References Cited

U.S. PATENT DOCUMENTS

| | | | |
|---|---|---|---|
| 5,944,797 A | 8/1999 | Gregg et al. | |
| 6,195,739 B1 | 2/2001 | Wright et al. | |
| 2004/0215852 A1* | 10/2004 | Klein .................. | G06F 9/30036 710/68 |
| 2007/0288810 A1* | 12/2007 | Sumimoto ......... | G11C 29/1201 714/719 |
| 2012/0110316 A1 | 5/2012 | Chamberlain et al. | |
| 2019/0129950 A1* | 5/2019 | Sarkar ..................... | G06F 3/061 |

FOREIGN PATENT DOCUMENTS

EP   1 050 800   11/2000

* cited by examiner

*Primary Examiner* — Ilwoo Park
(74) *Attorney, Agent, or Firm* — Joseph Mencher (57) ABSTRACT

A pipelined-data-transform-enabled data mover system includes a data mover device coupled to a memory system. The data mover device reads initial data from memory location(s) included in the memory system, and include at least one first data mover element that performs at least one intermediate data transform operation on the initial data in order to produce intermediate data. The data mover device also includes at least one second data mover element that subsequently performs at least one final data transform operation on the intermediate data in order to produce final data. The data mover device then writes the final data to memory location(s) included in the memory system. The data mover device may be configured by a processing system via a single descriptor that configures the data mover device to perform multiple read operations from different memory locations in the memory system in order to read the initial data.

20 Claims, 10 Drawing Sheets

PIPELINED-DATA-TRANSFORM-ENABLED DATA MOVER SYSTEM

BACKGROUND

The present disclosure relates generally to information handling systems, and more particularly to performing pipelined data transformations using a data mover device in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, often include processing systems (e.g. Central Processing Units (CPUs)) that are capable of providing multiple levels of data pipelining that are defined via instructions executed by those processing system. As would be understood by one of skill in the art in possession of the present disclosure, data pipelines are provided by sets of data processing elements connected in series such that the output of one data processing element provides the input to the next data processing element, with those data processing elements often executed in parallel or in time-sliced fashion with some amount of buffer storage provided between them. Data mover devices are now being introduced in server devices in order to provide for the movement of a data without the need to utilize significant processing system resources, but conventional data mover devices are single-stage, single execution step devices that simply move data from a source memory location to a destination memory location (while sometimes being enabled to perform other similarly simple functions), are not capable of multi-level/pipelined data transformations. As such, server devices implementing data mover devices still dedicate substantial processing system resources to data transformation operations.

Accordingly, it would be desirable to provide a data mover device that is capable of performing data transformation operations.

SUMMARY

According to one embodiment, an Information Handling System (IHS) includes a data mover processing subsystem; and a data mover memory subsystem that is coupled to the data mover processing subsystem and that includes instructions that, when executed by the data mover processing subsystem, cause the data mover processing subsystem to provide a data mover engine that is configured to: read, from at least one primary memory location included in a primary memory system, initial data; perform, via at least one first data mover element provided by in the data mover engine, at least one intermediate data transform operation on the initial data in order to produce intermediate data; perform, via at least one second data mover element provided by in the data mover engine, at least one final data transform operation on the intermediate data in order to produce final data; and write, to at least one primary memory location included in the primary memory system, the final data.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
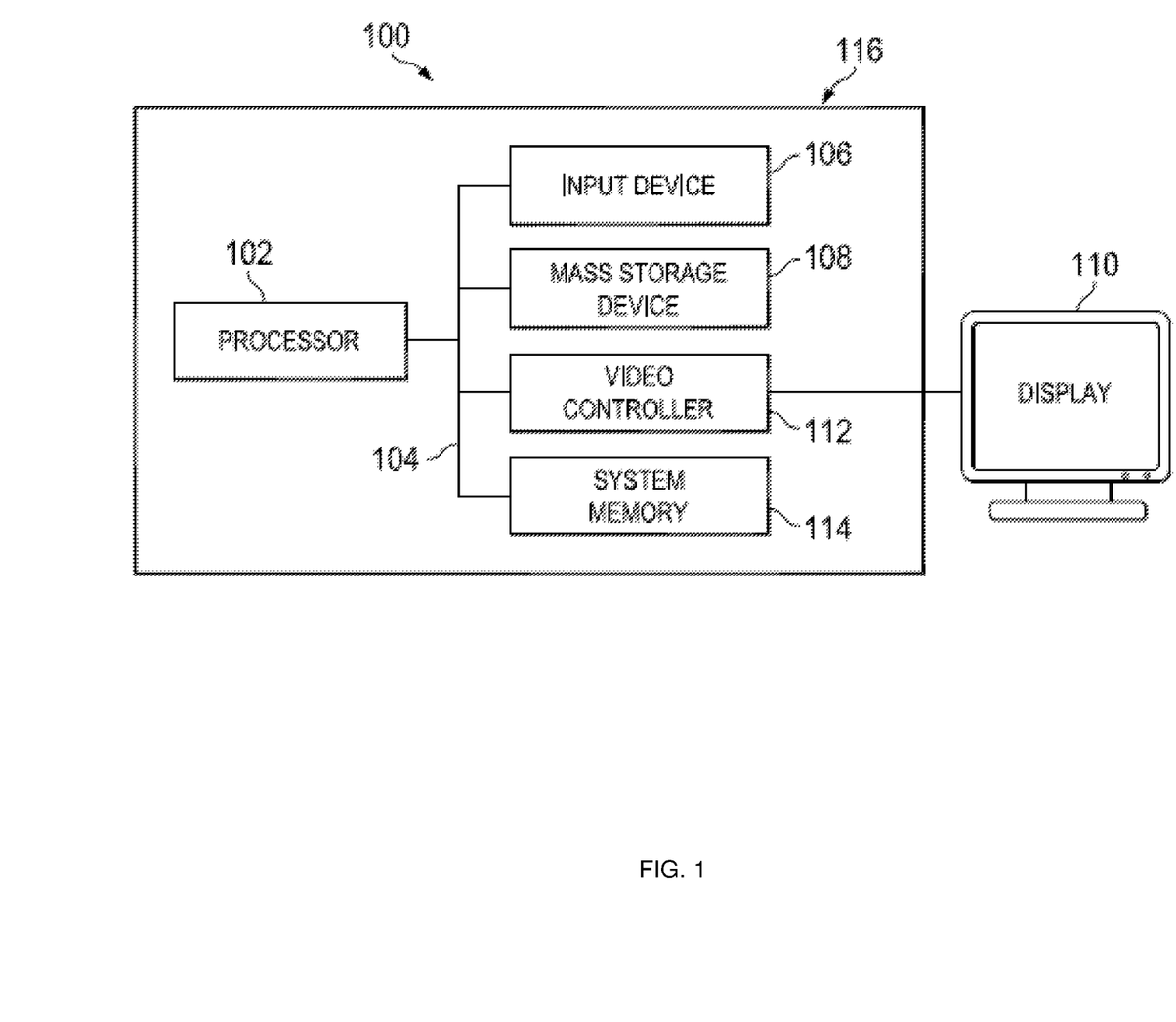
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
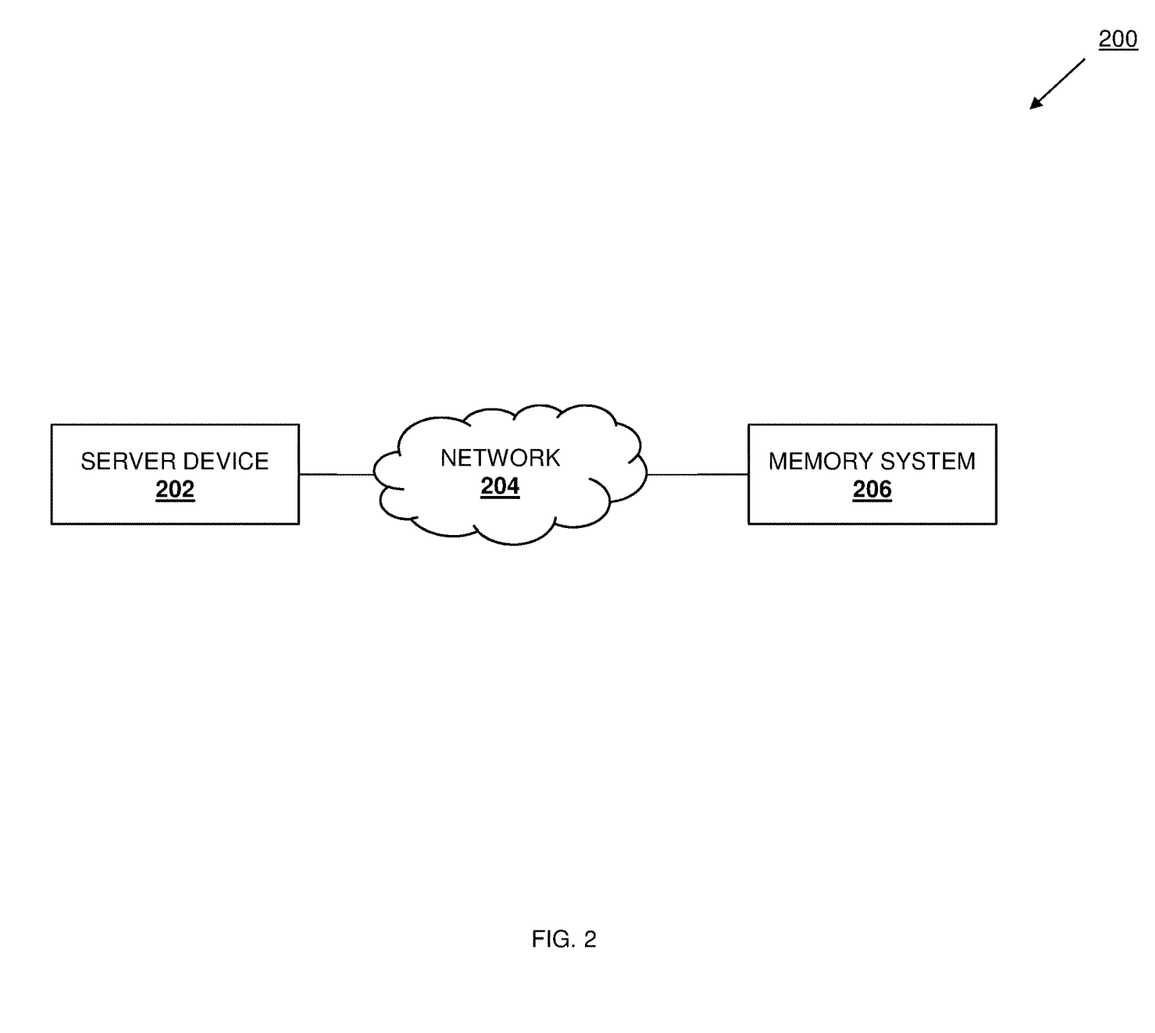
FIG. 2 is a schematic view illustrating an embodiment of a networked system.

Referring now to FIG. 2, an embodiment of a networked system 200 is illustrated. In the illustrated embodiment, the networked system 200 includes a server device 202. In an embodiment, the server device 202 may be provided by the IHS 100 discussed above with reference to FIG. 1, and/or may include some or all of the components of the IHS 100. However, while illustrated and discussed as a server device, one of skill in the art in possession of the present disclosure will recognize that the server device 202 provided in the networked system 200 may be provided by any devices that may be configured to operate similarly as discussed below. While only a single server device 202 is illustrated and discussed below, one of skill in the art in possession of the present disclosure will recognize that many more server devices may (and typically will) be provided in the networked system 200 (e.g., a datacenter) while remaining within the scope of the present disclosure.

In the Illustrated embodiment, the server device 202 is coupled to a network 204 that is included in the networked system 200 and that may be provided by, for example, a Local Area Network (LAN), the Internet, and/or any other network (or combination of networks) that would be apparent to one of skill in the art in possession of the present disclosure. Furthermore, the illustrated embodiment of the networked system 200 includes a memory system 206 that is coupled to the server device 202 via the network 204. In an embodiment, the memory system 206 may be provided by the IHS 100 discussed above with reference to FIG. 1, and/or may include some or all of the components of the IHS 100. In specific examples, the memory system 206 may be provided by one or more separate server devices, as a logical portion of one or more of the server devices 202, 204, and 206, and/or in a variety of other manners that would be apparent to one of skill in the art in possession of the present disclosure. In the embodiments discussed below, the memory system 206 provides a network-connected memory fabric that may be utilized by the server device 202 via the network 204.

For example, the network-connected memory fabric may be a Generation Z (Gen-Z) memory fabric created and commercialized by the Gen-Z consortium, and one of skill in the art in possession of the present disclosure will recognize that Gen-Z memory fabrics extend the processing system/memory system byte-addressable load/store model to the entire networked system 200 by decoupling the processing system/compute functionality in the server devices 202*a-c* from the memory system/media functionality in the memory system 206, allowing processing systems and memory system to act as peers that communicate using the same language and via simplified, high performance, low latency communication paths that do not incur the translation penalties and software overhead associated with conventional systems, thus eliminating bottlenecks and increasing efficiency via the unification of communication paths and simplification of software required for processing system/memory system communications. However, one of skill in the art in possession of the present disclosure will recognize that other types of memory fabrics will fall within the scope of the present disclosure as well. Furthermore, while the server device 202 is illustrated as coupled to the memory system 206 via the network 204, one of skill in the art in possession of the present disclosure will recognize that in other embodiments the memory system 206 may be provided in the server device 202 while still enabling the functionality described below while remaining within the scope of the present disclosure as well. As such, while a specific networked system 200 has been illustrated and described, one of skill in the art in possession of the present disclosure will recognize that the pipelined-data-transform-enabled data mover system of the present disclosure may utilize a variety of other components and component configurations while remaining within the scope of the present disclosure as well.

Figure 3:
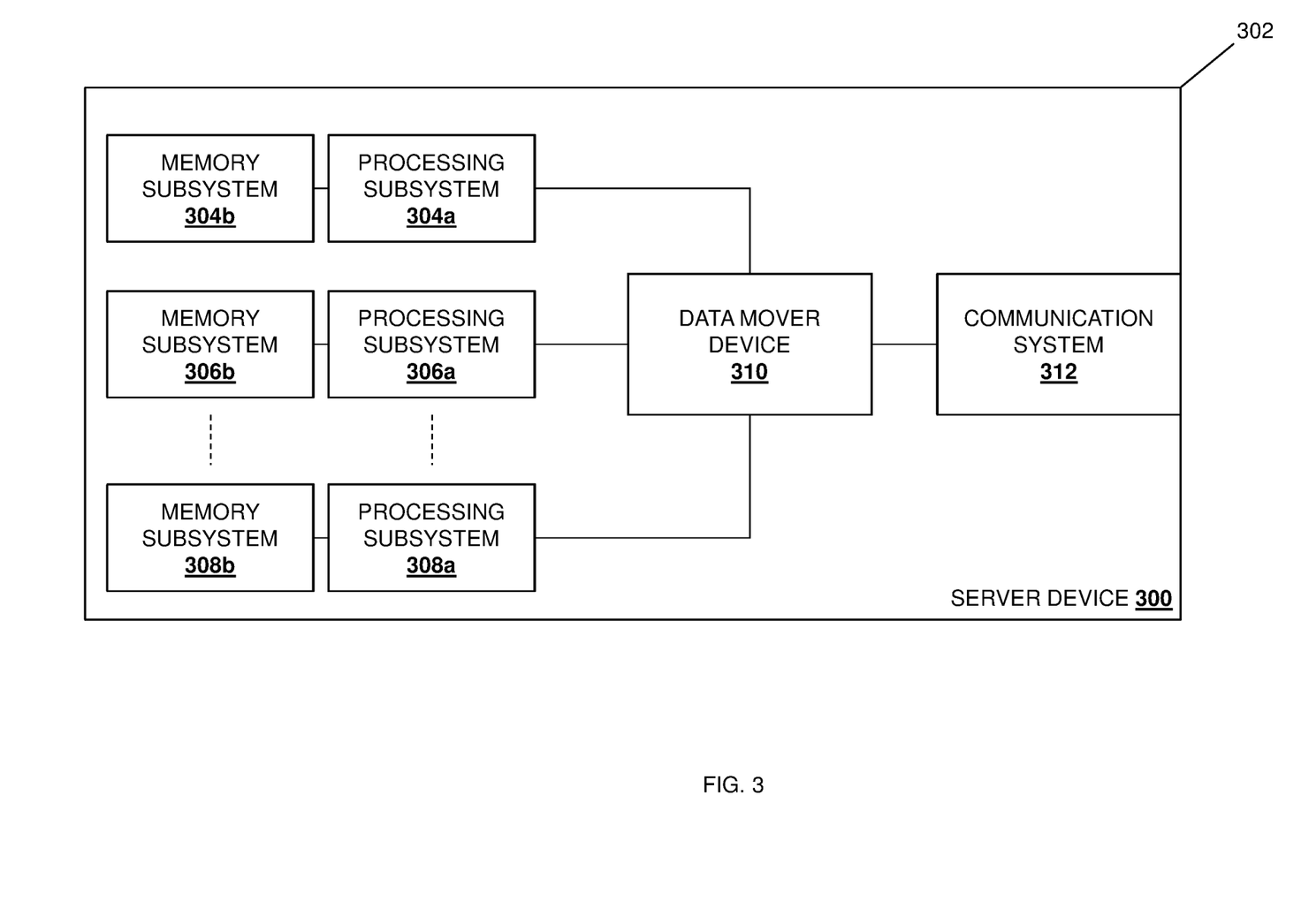
FIG. 3 is a schematic view illustrating an embodiment of a server device that may be provided in the networked system of FIG. 2 and that includes the pipelined-data-transform-enabled data mover system of the present disclosure.

Referring now to FIG. 3, an embodiment of a server device 300 is illustrated that may provide the server device 202 discussed above with reference to FIG. 2. As such, the server device 300 may be provided by the IHS 100 discussed above with reference to FIG. 1 and/or may include some or all of the components of the IHS 100. Furthermore, while illustrated and discussed as a server device 300, one of skill in the art in possession of the present disclosure will recognize that the functionality of the server device 300 discussed below may be provided by other devices that are configured to operate similarly as discussed below. In the illustrated embodiment, the server device 300 includes a chassis 302 that houses the components of the server device 300, only some of which are discussed below.

For example and as illustrated in FIG. 3, the chassis 302 may house a plurality of processing subsystems 304*a*, 306*a*, and up to 308*a*, with each of the processing systems 304*a*, 306*a*, and 308*a* coupled to respective memory subsystems 304*a*, 306*a*, and up to 308*a*. In different embodiments, the processing subsystems 304*a*, 306*a*, and 308*a* may be part of a single processing system (e.g., cores in a single processor), provided by different processing systems (e.g., in multi-processor systems), and/or combination thereof. Similarly, in different embodiments, the memory subsystems 304*b*, 306*b*, and 308*b* may be part of a single memory system, provided by different memory systems, and/or combination thereof. However, while a particular example of a processing system/memory system configuration is illustrated and described, one of skill in the art in possession of the present disclosure will recognize that a wide variety of processing system/memory system configurations will benefit from the teachings of the present disclosure as thus will fall within its scope as well.

In some embodiments, the chassis 302 may house a data mover processing system (not illustrated, but which may include the processor 102 discussed above with reference to FIG. 1) and a data mover memory system (not illustrated, but which may include the memory 114 discussed above with reference to FIG. 1) that is coupled to the data mover processing system and that includes instructions that, when executed by the data mover processing system, cause the data mover processing system to provide a data mover device 310 that is configured to perform the functionality of the data mover engines and/or data mover devices discussed below. In the illustrated embodiment, the data mover device 310 is illustrated as separate from the processing subsystems 304a, 306a, and 308a and, as such, may be provided by separate data mover hardware and software (e.g., a Field Programmable Gate Array (FPGA) provided on a Peripheral Component Interconnect express (PCIe) card, and/or other subsystem known in the art) coupled to those processing subsystems 304a, 306a, and 308a. However, in other embodiments, the data mover device 310 may be integrated with, included in, and/or otherwise part of any or each of the processing subsystems 304a, 306a, and 308a. As such, in those embodiments, the data mover device 310a may be provided by instructions on a local memory system in the server device 300 that is utilized by a CPU-independent portion of any or each of the processing subsystems 304a, 306a, and 308a, provided as an FPGA that is part of any or each of the processing subsystems 304a, 306a, and 308a, and/or provided in a variety of manners that would be apparent to one of skill in the art in possession of the present disclosure.

In some embodiments, in addition to the pipelined data transform operations discussed below, the data mover device 310 may be configured to perform read, write, copy, and/or other data movement operations for the processing subsystems 304a, 306a, and 308a in order to, for example, relieve the processing subsystems 304a, 306a, and 308a from having to use processing cycles to perform those operations. However, one of skill in the art in possession of the present disclosure will recognize that the pipelined data transform functionality of the data mover device 310 discussed below may be provided by itself and/or with other functionality while remaining within the scope of the present disclosure as well. While a few examples of data mover device implementations and functionality have been described, one of skill in the art in possession of the present disclosure will recognize that a variety of different functionality for the data mover device 310 may be enabled in a variety of manners that will fall within the scope of the present disclosure as well.

In the illustrated embodiment, the chassis 302 houses a communication subsystem 312 that may include a Network Interface Controller (NIC), wireless communication subsystems (e.g., BLUETOOTH®, Near Field Communication (NFC), WiFi, etc.), and/or other communication components that would be apparent to one of skill in the art in possession of the present disclosure. Furthermore, in embodiments of the present disclosure that utilize a memory fabric, the communication system 312 may be configured to provide memory fabric management operations for the server device 300. For example, when the memory fabric is a Gen-Z memory fabric as discussed above, the communication system 312 may include a Gen-Z Memory Management Unit (Gen-Z ZMMU) that, in the example provided below, operates as a Gen-Z ZMMU requester that provides access for the processing systems 304a, 306a, and 308a to the Gen-Z memory fabric (e.g., in cooperation with a Gen-Z ZMMU responder in the memory system 206). However, one of skill in the art in possession of the present disclosure will recognize that other memory fabric management subsystems for other memory fabrics may be utilized with the teachings of the present disclosure while remaining within its scope as well. While a specific server device 300 has been illustrated, one of skill in the art in possession of the present disclosure will recognize that server devices (or other devices operating according to the teachings of the present disclosure in a manner similar to that described below for the server device 300) may include a variety of components and/or component configurations for providing conventional server device functionality, as well as the functionality discussed below, while remaining within the scope of the present disclosure as well.

Figure 4:
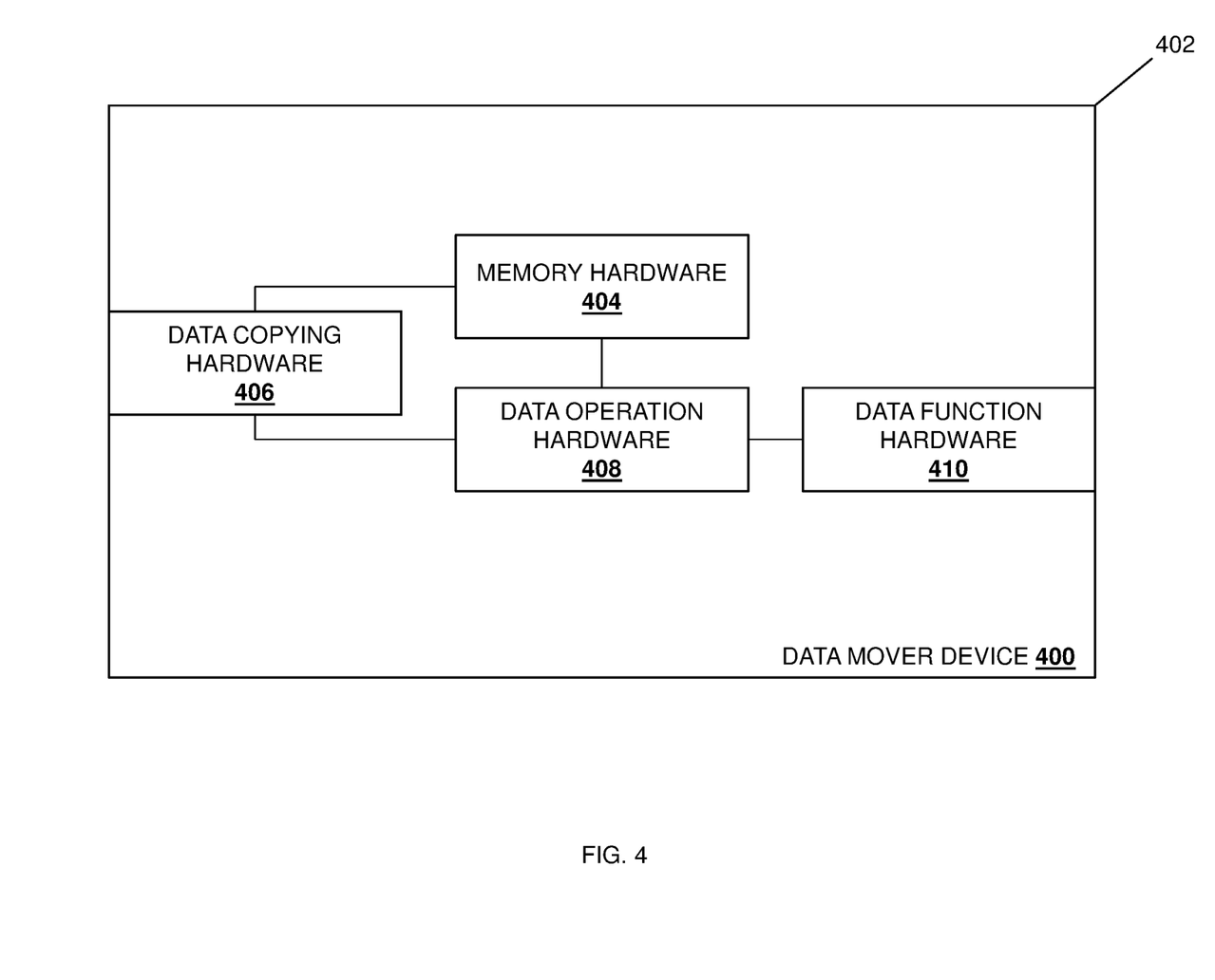
FIG. 4 is a schematic view illustrating an embodiment of a data mover device that may be provided in the server device of FIG. 3.

Referring now to FIG. 4, an embodiment of a data mover device 400 is illustrated that may be the data mover device 310 discussed above with reference to FIG. 3. As such, the data mover device may be provided by a data mover processing system (not illustrated, but which may include the processor 102 discussed above with reference to FIG. 1) and a data mover memory system (not illustrated, but which may include the memory 114 discussed above with reference to FIG. 1) that is coupled to the data mover processing system and that includes instructions that, when executed by the data mover processing system, cause the data mover processing system to provide the data mover device 400 that is configured to perform the functionality of the data mover engines and/or data mover devices discussed below.

Furthermore, as also discussed above, the data mover device 400 may be a device that is separate from the processing subsystems 304a, 306a, and 308a discussed above with reference to FIG. 2 and, as such, may be provided by separate data mover hardware and software (e.g., a Field Programmable Gate Array (FPGA) provided on a Peripheral Component Interconnect express (PCIe) card, and/or other subsystems known in the art) coupled to those processing subsystems 304a, 306a, and 308a. However, as also discussed above, the data mover device 400 may be integrated with, included in, and/or otherwise part of any or each of the processing subsystems 304a, 306a, and 308a. As such, in those embodiments, the data mover device 400 may be provided by instructions on a local memory system in the server device 300 that is utilized by a CPU-independent portion of any or each of the processing subsystems 304a, 306a, and 308a, provided as an FPGA that is part of any or each of the processing subsystems 304a, 306a, and 308a, and/or provided in a variety of manners that would be apparent to one of skill in the art in possession of the present disclosure, and one of skill in the art in possession of the present disclosure will recognize that many efficiencies may be realized by providing the data mover device as part a processing system. In some examples, the data mover device 400 may appear to the processing subsystems 304a, 306a, and 308a as a separate, connected PCIe device (regardless of whether that data mover device 400 is provided separately from or as part of that processing subsystem).

In the illustrated embodiment, the data mover device 400 includes a chassis 402 that houses the components of the data mover device 400, only some of which are illustrated in FIG. 4. As discussed above, the chassis 402 may be a processing system chassis (e.g., when the data mover device is integrated with a processing system), a sub-chassis within a processing system chassis, an FPGA chassis, a PCI-e card, and/or any other chassis that would be apparent to one of skill in the art in possession of the present disclosure. As illustrated in FIG. 4, the chassis 402 may house memory hardware 404 that, as discussed in the examples provided below, may be configured to provide for the storage of data, and thus may include memory devices, data storage subsystems that provide data storage arrays, and/or other similar subsystems that would be apparent to one of skill in the art in possession of the present disclosure. The chassis 402 may also house data copying hardware 406 that is coupled to the memory hardware 404 and that, as discussed in the examples below, may be configured to provide copy engine(s) that are configured to access memory system(s) and copy data from accessible memory systems, as well perform operations that enable any of the data transform operations discussed below.

The chassis 402 may also house data operation hardware 408 that is coupled to the memory hardware 404 and the data copying hardware 406 and that, as discussed in the examples below, may be configured to provide data operation engine(s) that are configured to perform any of the data transform operations discussed below. The chassis 402 may also house data function hardware 410 that is coupled to the data operation hardware 408 and that, as discussed in the examples below, may be configured to provide data function engine(s) that are configured to any of the data transform operations discussed below. However, while a specific data mover device 400 has been illustrated and described, one of skill in the art in possession of the present disclosure will recognize that data mover devices provided according to the teachings of the present disclosure may include a variety of different hardware subsystems that may enable a variety of different data transform functionality while remaining within the scope of the present disclosure as well. One of skill in the art in possession of the present disclosure will recognize that the hardware subsystems provided in the data mover device 400 allow for complex data transform configurations (one example of which is discussed below) that enable a variety of complex data transformation functionality that simply is not available in conventional data mover devices.

Figure 5:
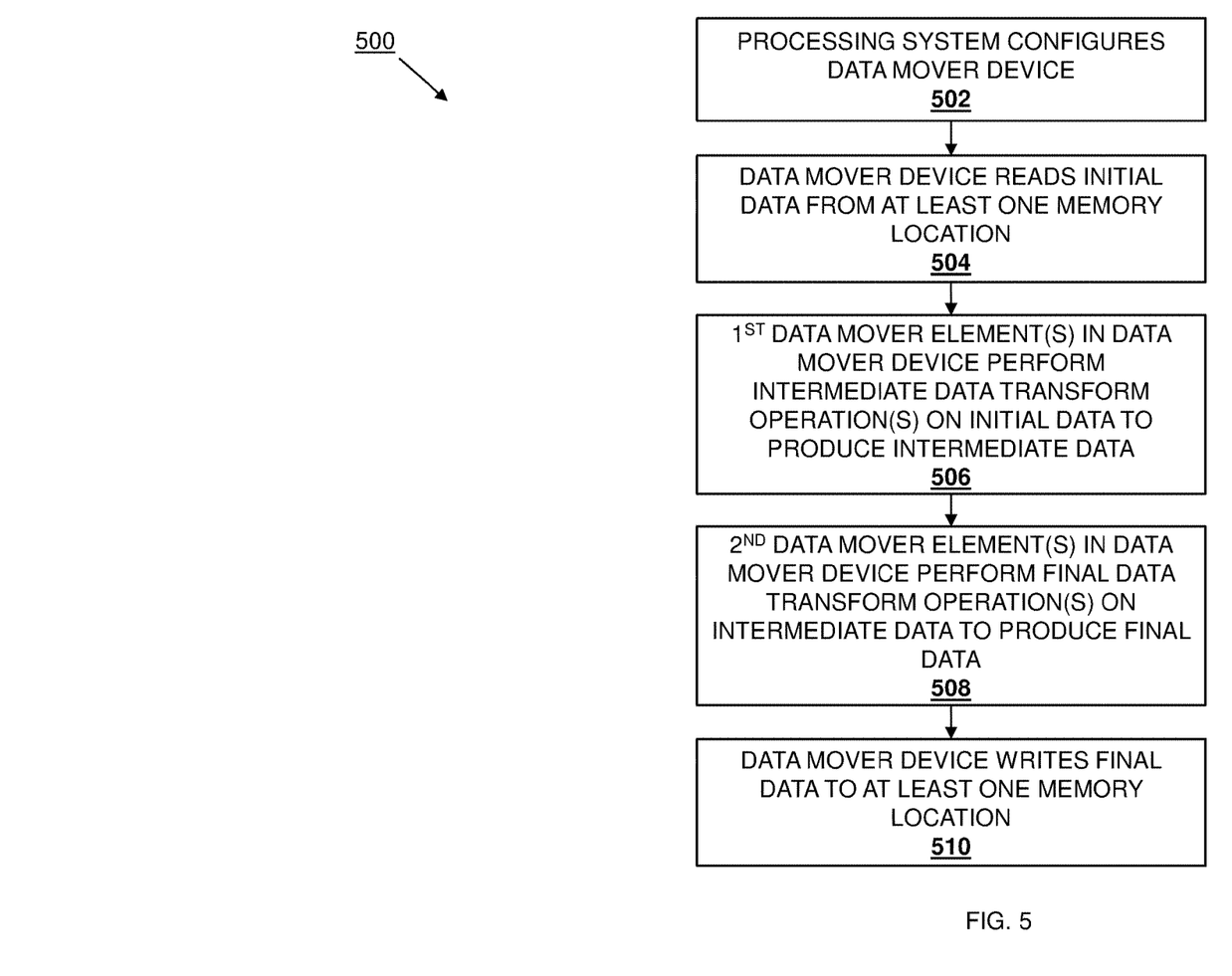
FIG. 5 is a flow chart illustrating an embodiment of a method for providing pipelined data transformation using a data mover device.

Referring now to FIG. 5, an embodiment of a method 500 for providing pipelined data transformation via a data mover system is illustrated. As discussed below, the systems and methods of the present disclosure provide an architectural data mover device that may be provided as part of a processing system (although implementations of the data mover device of the present disclosure that are separate from any processing systems will fall within the scope of the present disclosure as well.) The data mover device of the present disclosure is envisioned as being provided via a specification that is configured to maintain generational compatibility, while maintaining an instruction-set-architecture-like stability such that data mover micro-operations (i.e., that provide for any particular data movement and/or transform operations) are modeled similarly to corresponding processing system micro-operations. As discussed below, a compiler or operating system for the data mover device may be built on the platform for the processing system and may support the instruction set architecture for that processing system and the data mover device as well, allowing it to configure the data mover device to perform any of a variety of desired data transform operations. As such, the data mover device may be configured by the processing system to read initial data from at least one memory location included in a memory system, have at least one first data mover element included in the data mover device perform at least one intermediate data transform operation on the initial data in order to transform the initial data to intermediate data, have at least one second data mover element included in the data mover device perform at least one final data transform operation on the intermediate data in order to transform the intermediate data to final data; and write the final data to at least one memory location included in the memory system. Thus, architectural data movers are described that provide for pipelined data transformations in order to further offload such data transform operations from utilizing processing system resources.

The method 500 begins at block 502 where processing system configured a data mover device. In an embodiment, at block 502, a processing subsystem in the server device 300 may operate to configure the data mover device 310/400 by, for example, providing a data transform configuration that configures hardware in the data mover device 310/400 to perform any of a variety of pipelined data transform operations. As will be understood by one of skill in the art in possession of the present disclosure, instructions utilized by processing systems to perform pipelined data transform operations will differ from instructions necessary to provide similar functionality in a data mover device. For example, the Table A below illustrates particular processing system instructions and their analogous data mover instructions:

| PROCESSING SYSTEM INSTRUCTION | DATA MOVER INSTRUCTION |
| --- | --- |
| OPERAND | DESCRIPTOR |
| OPERATOR | DATA TRANSFORM FUNCTION |
| MNEMONICS | DESCRIPTOR SPECIFICATION |
| GRAMMAR CHECK | DESCIRPTOR LOGIC DECODER |
| PARSER | WAVE STREAM DECODER |
| PRIVILEGE CHECK | ACCESS CONTROL LIST |
| CONTEXT STATE (ENVIRONMENTAL VARIABLES | DEVICE LOCAL MEMORY WITH PREFILL DATA VARIABLES/STATE |

As would be appreciated by one of skill in the art in possession of the present disclosure, the list of processing system instructions in the left column of Table A above may be transformed into the corresponding data mover instructions in the right column of Table A, and may be utilized to configure the data mover device 310/400 to perform the memory/data compare operation(s) and memory/data difference operations discussed in the examples provided below, as well as data encryption operations, data compression operations, and/or a variety of other data transform operations that would be apparent to one of skill in the art in possession of the present disclosure. For example, the compiling/operating system for the data mover device 310/400 may build the processing system/data mover device instruction sets that make up the data transform configuration provided to the data mover device 310/400 at block 502 during a server device build-time for the server device 300. In a specific example, the following instruction code may be provided to the compiler/operating system for the data mover device 310/400 in order to cause that compiler/operating system to build the instruction sets/data transform configuration for performing memory/data compare operations when a processing system and a data mover device are both found to be present in the server device 300 during server device build-time:

```
#define CPU
    status = memcmp(src A, dest B, size)
#else DATA_MOVER
    Status = data_mover_memcmp (src A, dest B, size)
#endif
```

As will be appreciated by one of skill in the art in possession of the present disclosure, compilers/operating systems programmed with such instruction code enable the integration of data mover devices and compiler/operating systems so that such compilers/operating systems may insert data mover mnemonics in the data mover devices in order to accelerate data transformation operations that would otherwise be performed by the processing system.

In one example of pre-configuration operations for the server device 300, at server device build-time for the server device 300 the compiler/operating system for the data mover device 310/400 may perform a check on the data mover device 310/400 in order to determine any processing system/ pipelined data transform functionality is supported by the data mover device 310/400, and may then operate to build the instruction sets/data transform configurations that may be subsequently provided by the processing system to the data mover device 310/400 at block 502 of the method 500. In a specific example and with reference to the instruction set correspondence in Table A above, the compiler/operating system for the data mover device 310/400 identify operand(s) in a processing system instruction set that provides particular pipelined data transform functionality, and then determine whether the corresponding descriptor(s) exists in the data mover device 310/400 and, if so, may build the instruction set associated with those operand(s) using the corresponding descriptor(s) for the data mover device 310/400. However, while a specific example of the building of instruction sets/data transform configurations has been described, one of skill in the art in possession of the present disclosure will recognize that a variety of instruction sets/ data transform configurations may be generated in a similar manner while remaining within the scope of the present disclosure as well.

Figure 6A:
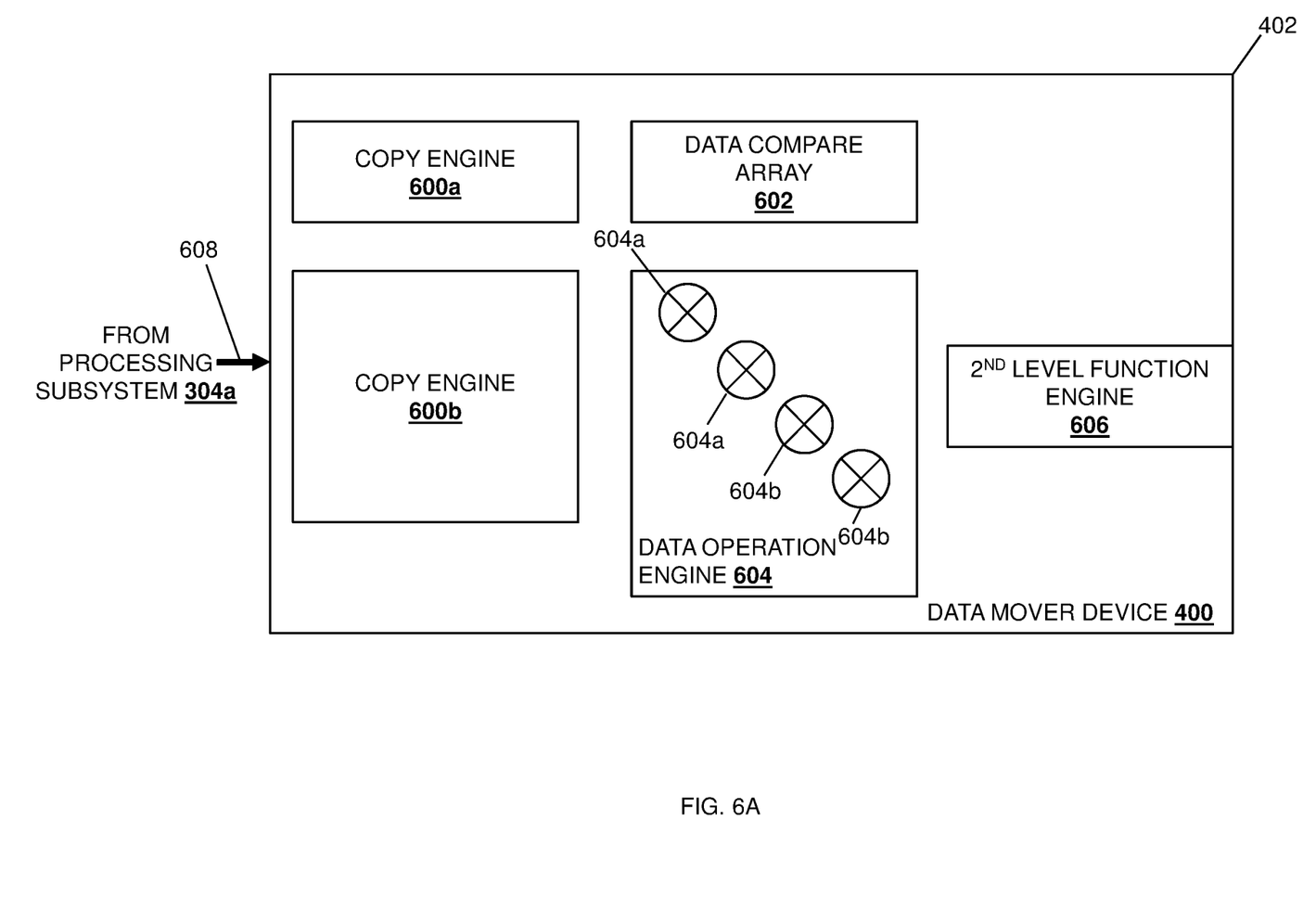
FIG. 6A is a schematic view illustrating an embodiment of the data mover device of FIG. 4 operating during the method of FIG. 5.

In the specific example provided in FIG. 6A, the data copying hardware 406 in the data mover device 310/400 is illustrated as providing a pair of copy engines 600a and 600b, the memory hardware 404 in the data mover device 310/400 is illustrated as providing a data compare array 602, the data operation hardware 408 in the data mover device 310/400 is illustrated as providing a data operation engine 604 that includes first data operation elements 604a and second data operation elements 604b, and the data function hardware 410 in the data mover device 310/400 is illustrated as providing a second level function engine 606, each of which are discussed in further detail below. For example, at block 502 and as illustrated in the example provided in FIG. 6A, the processing subsystem 304a may provide a data transform configuration 608 to the data mover device 310/ 400 in order configure any of the hardware/engines/subsystems provided in the data mover device 310/400. In a specific example, the data transform configuration 608 may be stored in the memory subsystem 304b for the processing subsystem 304a, and the processing system 304a may retrieve that data transform configuration 608 from the memory subsystem 304b for use in configuring the data mover device 310/400.

In a specific example, the data transform configuration 608 may include descriptors (which may correspond to operand instructions for a processing system) that the processing subsystem 304a loads into the data mover device 310/400 at block 502 in order to configure the hardware/ engines/subsystem in the data mover device 310/400 to operate in the manner discussed below. For example, in order to provide the memory/data compare operations and memory/data difference operations discussed below, the data transform configuration 608 may include a descriptor that causes the data copying hardware 406 to provide the copy engines 600a and 600b that read from the different memory locations discussed below. In particular, via the teachings of the present disclosure, the processing subsystem 304a may load a single descriptor into the data mover device that configures the data mover device to perform multiple read operations from different memory locations in the memory system via, for example, the provisioning of the copy engines 600 and 600b by the data copying hardware 406. However, while a specific example has been provided, one of skill in the art in possession of the present disclosure will recognize that the data mover device 310/400 may be configured in a variety of manners that will fall within the scope of the present disclosure as well.

Figure 6B:
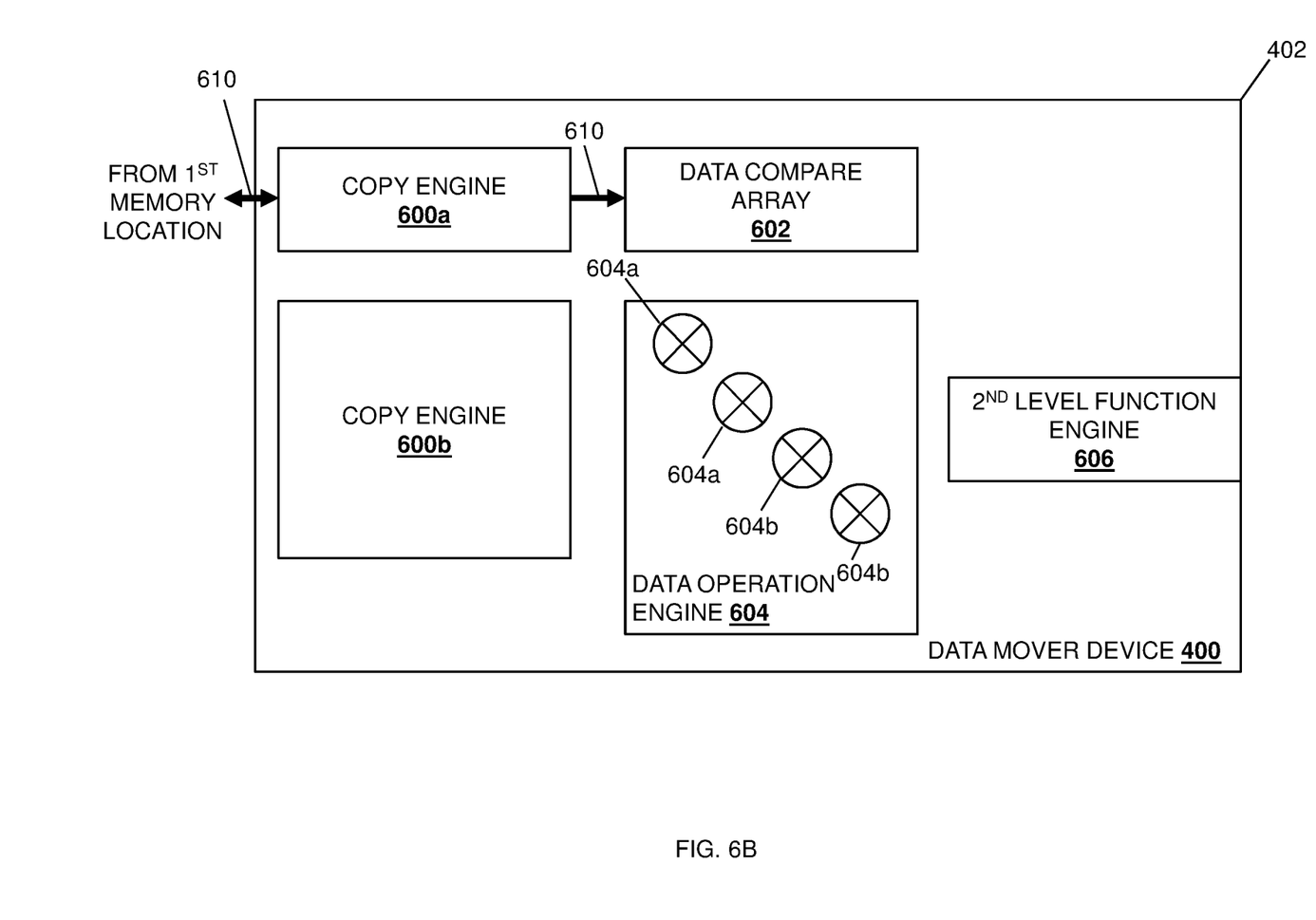
FIG. 6B is a schematic view illustrating an embodiment of the data mover device of FIG. 4 operating during the method of FIG. 5.

The method 500 then proceeds to block 504 where the data mover device reads initial data from at least one memory location. In an embodiment, at block 504, the copy engines 600a provided by the data copying hardware 406 in the data mover device 310/400 may operate to read initial data from a first memory location. As discussed above, the configuration of the data mover device 310/400 at block 502 (and in particular the configuration of that data mover device 310/400 via the single descriptor discussed above) may have configured the data copying hardware 406 to provide the copy engine 600a that operates to read initial data 610 from a first memory location (as well as provide the copy engine 600b that operates to read initial data from a second memory location discussed below), and provide that initial data 610 for storage in the data compare array 602 provided by the memory hardware 404 in the data mover device 310/400, as illustrated in FIG. 6B. For example, the first memory location may include an original data set, while a second memory location ready by the copy engine 600b may include a modified (or possibly modified) data set that is to be compared to the original data set. As would be appreciated by one of skill in the art in possession of the present disclosure, the first memory location and/or the second memory location may be provided in any of the memory system 206, memory subsystems 304b, 306b, and 308b, and/or in any other memory system accessible by the data mover device 310/400. Furthermore, while a specific example has been described, one of skill in the art in possession of the present disclosure will recognize that the reading of the initial data by the data mover device 310/400 may be performed in a variety of manners depending on the data transformation operations being performed. For example, for the data encryption and/or data compression operations described herein, the initial data may be read from a single memory location, may include the reading of data to-be encrypted or compressed from a first memory location and the reading of encryption key data or compression algorithm data from a second memory location.

Figure 6C:
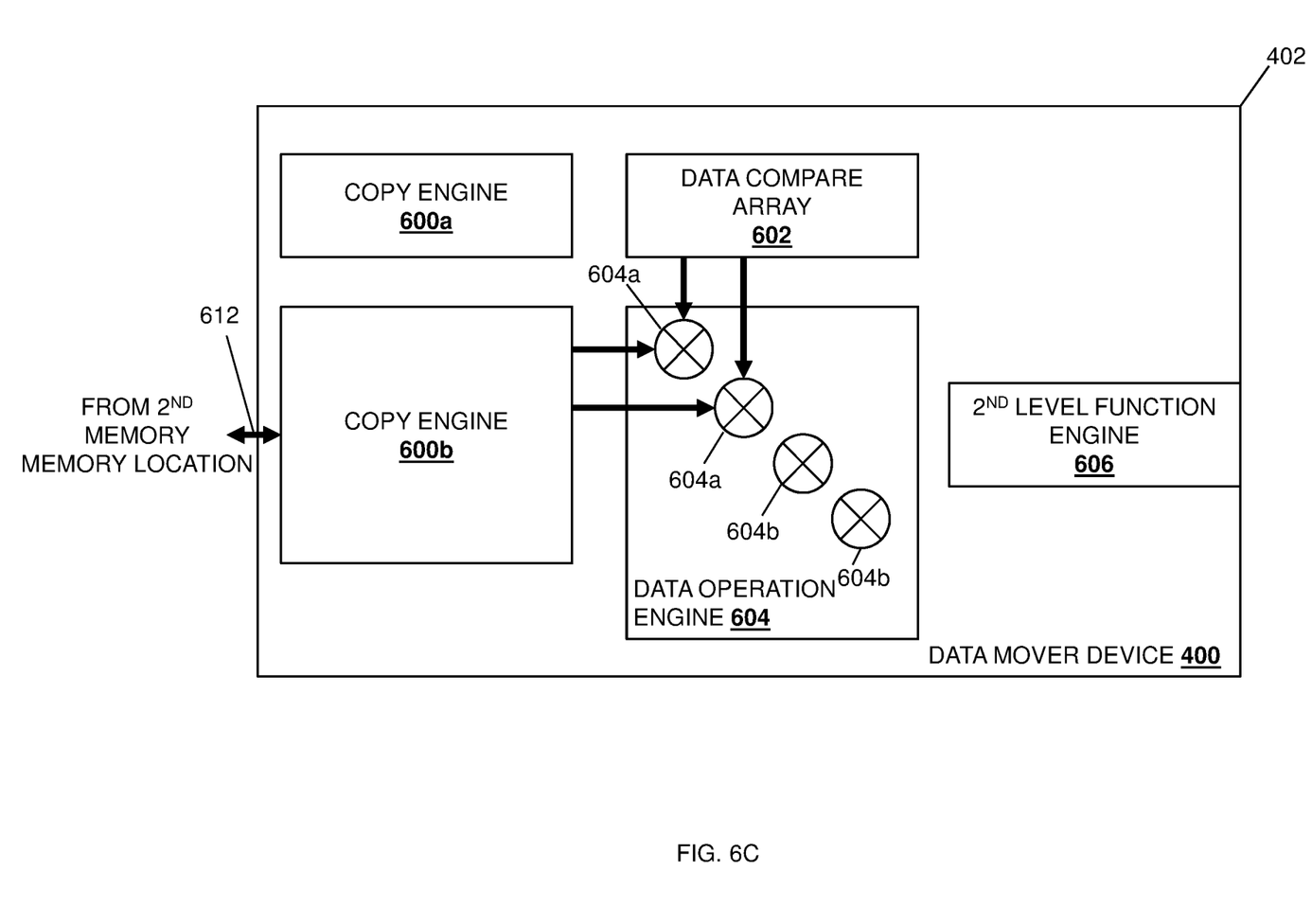
FIG. 6C is a schematic view illustrating an embodiment of the data mover device of FIG. 4 operating during the method of FIG. 5.

The method 500 then proceeds to block 506 where first data mover element(s) in the data mover device perform intermediate data transform operation(s) on the initial data to produce intermediate data. As discussed above, the configuration of the data mover device 310/400 at block 502 (and in particular via the single descriptor discussed above) may have configured the data copying hardware 406 to provide the copy engine 600b that operates to read initial data 612 from a second memory location, and provide that initial data 612 for intermediate data transform operations, as illustrated in FIG. 6C. In the illustrated embodiment, the intermediate data transform operations 614 are provided by the data operation elements 604a in the data operation engine 604 that, in the specific example, provided in FIGS. 6A-C, are performing XOR operations in order to compare original data retrieved from the first memory location and stored in the data compare array 602 to modified (or possibly modified) data retrieved by the copy engine 600b from the second memory location. As would be appreciated by one of skill in the art in possession of the present disclosure, the result of the XOR operations performed by the data operation elements 604a in the data operation engine 604 may produce intermediate data that identifies whether the XOR operation determined a difference in the data being compared. However, in other example, the intermediate data transform operations may include first data encryption operations that produce intermediate encrypted data, first compression operations that produce intermediate compressed data, and/ or any other data transform operations that would be apparent to one of skill in the art in possession of the present disclosure.

Figure 6D:
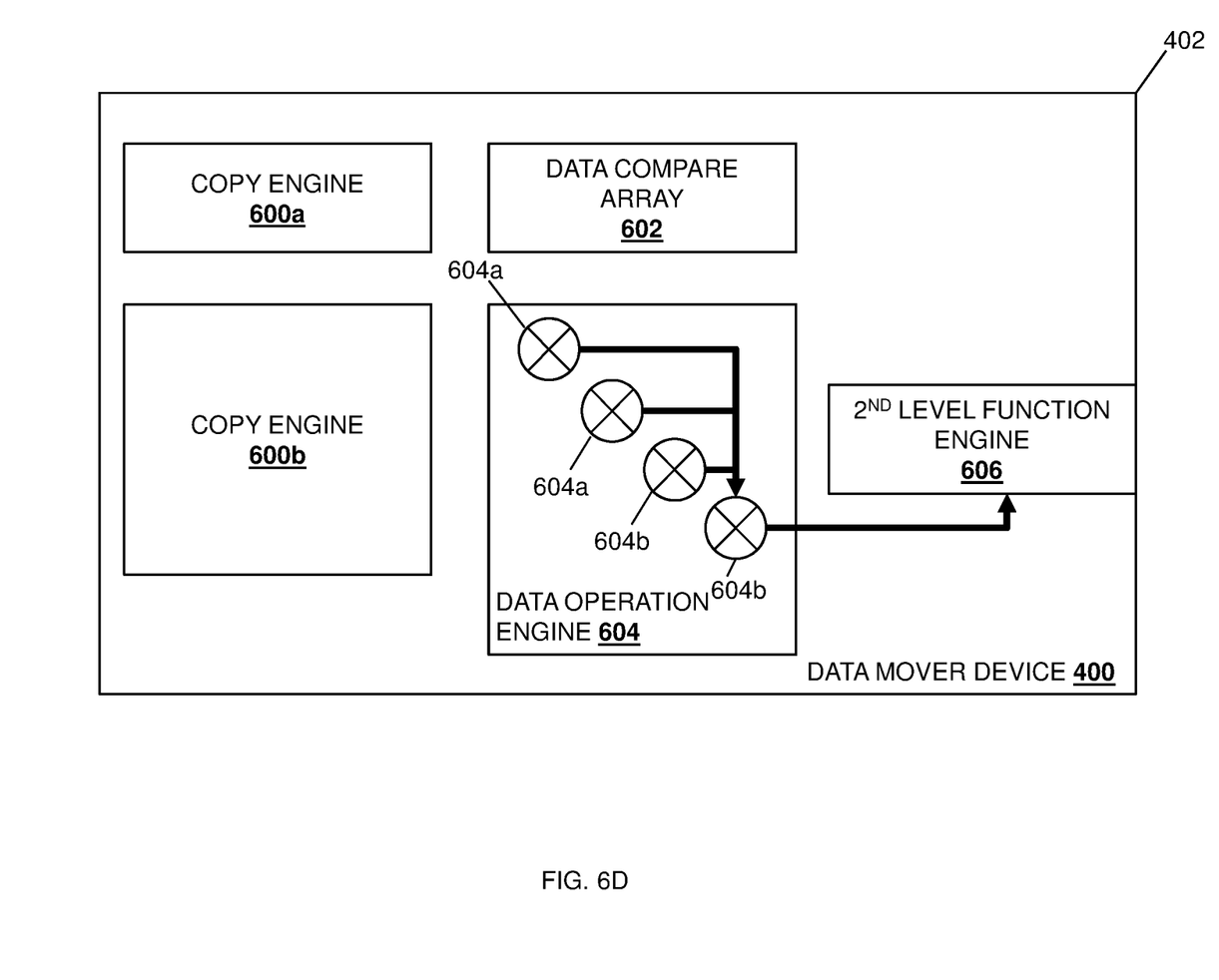
FIG. 6D is a schematic view illustrating an embodiment of the data mover device of FIG. 4 operating during the method of FIG. 5.

The method 500 then proceeds to block 508 where second data mover element(s) in the data mover device perform intermediate data transform operation(s) on the intermediate data to produce final data. In an embodiment, at block 508 and as illustrated in FIG. 6D, the final data transform operations 614 are provided by the data operation elements 604b in the data operation engine 604 that are performing XOR operations in this specific example in order to compare data. As would be appreciated by one of skill in the art in possession of the present disclosure, the result of the XOR operations performed by the data operation elements 604a in the data operation engine 604 may produce intermediate data that identifies whether the XOR operation determined a difference in the data being compared, and the final data operations performed by the data operation elements 604b may include a variety of operations (e.g., polynomial transform functions, multiply and accumulate functions, encoding functions, etc.) that may provide for the transformation the intermediate data to final data which, as illustrated in the specific example in FIG. 6D, is transmitted by one of the data operation elements 604b to the second level function engine 606 provided by the data function hardware 410. However, in other example, the final data transform operations may include second data encryption operations that produce final encrypted data, second compression operations that produce final compressed data, and/or any other data transform operations that would be apparent to one of skill in the art in possession of the present disclosure.

Figure 6E:
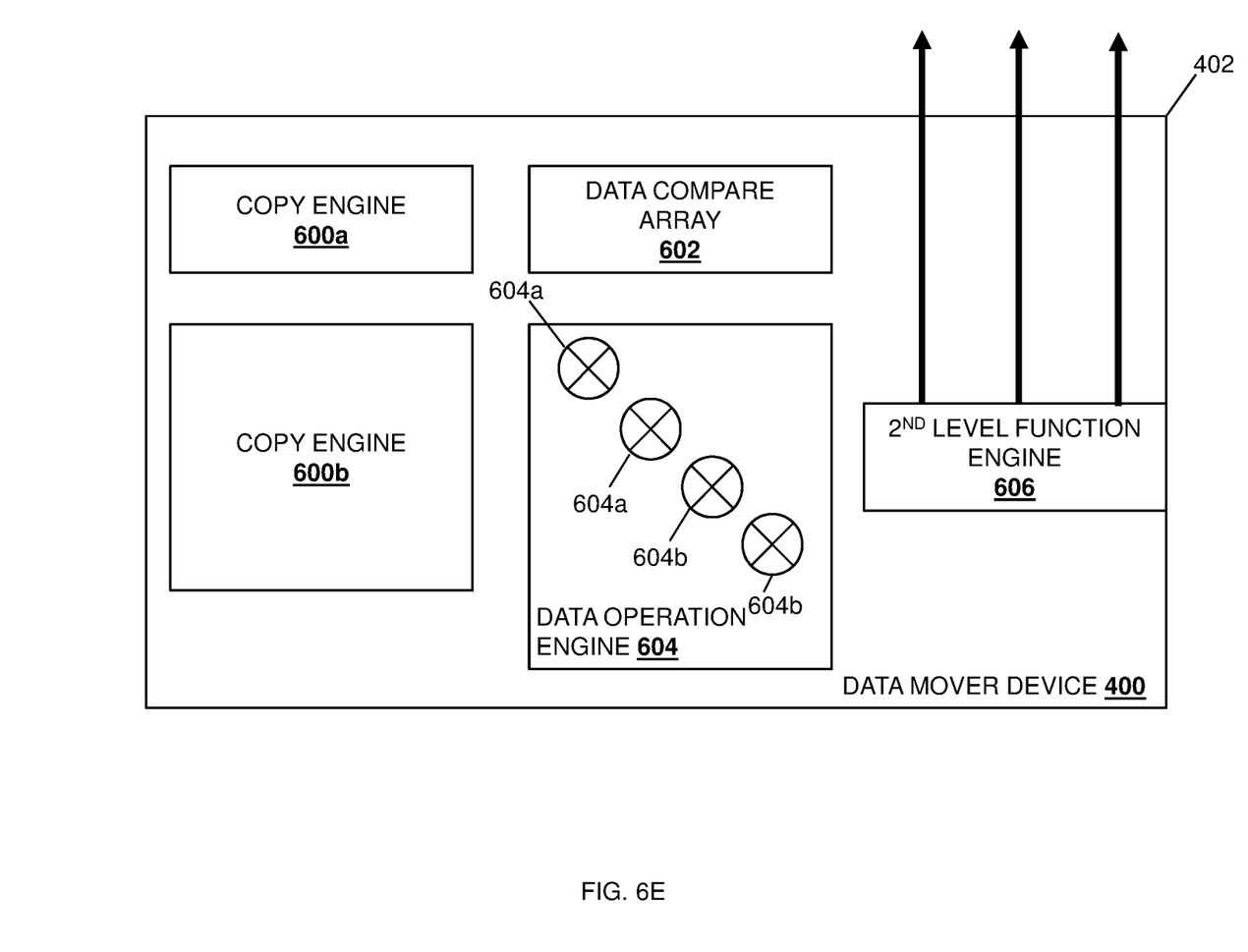
FIG. 6E is a schematic view illustrating an embodiment of the data mover device of FIG. 4 operating during the method of FIG. 5.

The method 500 then proceeds to block 510 where the data mover device writes the final data to at least one memory location. In an embodiment, at block 510 and as illustrated in FIG. 6E, the second level function engine 606 provided by the data function hardware 410 may write the final data received at block 508 to one or more memory locations included in an accessible memory system (e.g., the memory system 206, memory subsystems 304b, 306b, and 308b, and/or any other accessible memory system.) For example, at block 510 the second level function engine may write the final data that includes the results of a pipelined memory/data compare operation to one or more memory locations included in an accessible memory system. In another example, at block 510 the second level function engine may write the final data that includes the memory data differences identified in a pipelined memory/data diff operation to one or more memory locations included in an accessible memory system. In yet another example, at block 510 the second level function engine may write the final data that includes encrypted data generated in a pipelined data encryption operation to one or more memory locations included in an accessible memory system. In yet another example, at block 510 the second level function engine may write the final data that includes compressed data generated in a pipelined data compression operation to one or more memory locations included in an accessible memory system. While a few specific examples have been described, one of skill in the art in possession of the present disclosure will recognize that any final data generated via any pipelined data transformation operations performed by the data mover device may be written to memory location(s) at block 510 while remaining within the scope of the present disclosure.

Thus, systems and methods have been described that may provide an architectural data mover device as part of a processing system and via a specification that is configured to maintain generational compatibility, while also maintaining an instruction-set-architecture-like stability such that data mover micro-operations (i.e., that provide for any particular data movement and/or transform operations) are modeled similarly to corresponding processing system micro-operations. A compiler or operating system for the data mover device built on the platform for the processing system supports the instruction set architecture for that processing system and the data mover device as well, allowing configuration of hardware subsystems in the data mover device to perform any of a variety of desired data transform operations. As such, the data mover device may be configured by the processing system to read initial data from memory location(s) included in a memory system, have first data mover element(s) included in the data mover device perform intermediate data transform operation(s) on the initial data in order to transform the initial data to intermediate data, have second data mover element(s) included in the data mover device perform final data transform operation(s) on the intermediate data in order to transform the intermediate data to final data, and write the final data to memory location(s) included in the memory system. Thus, architectural data movers are described that provide for pipelined data transformations that operate to further offload data transform operations from utilizing processing system resources Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A pipelined-data-transform-enabled data mover system, comprising:
   a memory system that includes a network-connected memory fabric;
   a processing system that is coupled to the memory system and that is configured to execute processing system instructions that cause the processing system to perform one or more pipelined data transform operations when a data mover device is not available; and
   a data mover device that is coupled to the network-connected memory fabric via a network, that is coupled to the processing system, and that is configured to:

receive, from the processing system, a data transform configuration that includes data mover instructions that were converted from analogous processing system instructions that are included in the processing system instructions and that are configured to cause the processing system to perform the one or more pipelined data transform operations when the data mover device is not available;

configure, using the data mover instructions, the data mover device to perform the one or more pipelined data transform operations;

read, via the network from at least one memory location included in the network-connected memory fabric using a copy engine that is provisioned for each at least one memory location using the data mover instructions, initial data;

perform, via at least one first data mover element that is included in the data mover device, that is provisioned using the data mover instructions, and without utilizing resources of the processing system, at least one intermediate data transform operation on the initial data in order to produce intermediate data;

output the intermediate data from the at least one first data mover element to provide an input to at least one second data mover element that is included in the data mover device and that is provisioned using the data mover instructions to perform at least one final data transform operation on the intermediate data in order to produce final data;

perform, via the at least one second data mover element without utilizing resources of the processing system, the at least one final data transform operation on the intermediate data in order to produce the final data; and write, to at least one memory location included in the network-connected memory fabric over the network and using a second level function engine provisioned using the data mover instructions, the final data.

2. The system of claim 1, wherein the data transform configuration includes a single descriptor that configures the data mover device to perform multiple read operations from different memory locations in the network-connected memory fabric in order to read the initial data.

3. The system of claim 1, wherein the data mover device is configured to
store the intermediate data prior to performing the at least one final data transform operation.

4. The system of claim 1, wherein the at least one intermediate data transform operation includes a memory compare operation that compares the initial data retrieved from different memory locations in the network-connected memory fabric, and wherein the at least one final data transform operation includes a data difference operation that identifies differences in the intermediate data produced from the comparison performed in the memory compare operation to provide the final data.

5. The system of claim 1, wherein the at least one intermediate data transform operation includes a first data encryption operation performed on the initial data retrieved from the network-connected memory fabric to produce the intermediate data, and wherein the at least one final data transform operation includes a second data encryption operation performed on the intermediate data produced from the first data encryption operation to provide the final data.

6. The system of claim 1, wherein the data mover device is configured to:

perform a data movement operation that includes moving data from a source memory location in the network-connected memory fabric to a destination memory location in the network-connected memory fabric, wherein the data movement operation includes at least one of a read operation, a write operation, or a copy operation that is performed by the data mover device to relieve the processing system from having to use processing cycles to perform the at least one of the read operation, the write operation, or the copy operation.

7. An Information Handling System (IHS), comprising:
a data mover processing subsystem; and
a data mover memory subsystem that is coupled to the data mover processing subsystem and that includes instructions that, when executed by the data mover processing subsystem, cause the data mover processing subsystem to provide a data mover engine that is configured to:
receive, from a primary processing system, a data transform configuration that includes data mover instruction that were converted from analogous primary processing system instructions and that are configured to cause the primary processing system to perform one or more pipelined data transform operations when the data mover engine is not available;

configure, using the data mover instructions, the data mover engine to perform the one or more pipelined data transform operations;

read, from at least one primary memory location that is provided by a primary memory system that is coupled to the primary processing system using a copy engine that is provisioned for each at least one primary memory location using the data mover instructions, initial data;

perform, via at least one first data mover element that is provided by the data mover engine, that is provisioned using the data mover instructions, and without utilizing resources of the primary processing system, at least one intermediate data transform operation on the initial data in order to produce intermediate data;

output the intermediate data from the at least one first data mover element to provide an input to at least one second data mover element that is provided by the data mover engine and that is provisioned using the data mover instructions to perform at least one final data transform operation on the intermediate data in order to produce final data;

perform, via the at least one second data mover element without utilizing resources of the primary processing system, the at least one final data transform operation on the intermediate data in order to produce the final data; and write, to at least one primary memory location using a second level function engine provisioned using the data mover instructions, the final data.

8. The IHS of claim 7, wherein the data transform configuration includes a single descriptor that configures the data mover engine to perform multiple read operations from different primary memory locations in the primary memory system in order to read the initial data.

9. The IHS of claim 7, wherein the data mover engine is configured to:
store the intermediate data prior to performing the at least one final data transform operation.

10. The IHS of claim 7, wherein the at least one intermediate data transform operation includes a memory compare operation that compares the initial data retrieved from different primary memory locations in the primary memory system, and wherein the at least one final data transform operation includes a data difference operation that identifies differences in the intermediate data produced from the comparison performed in the memory compare operation to provide the final data.

11. The IHS of claim 7, wherein the at least one intermediate data transform operation includes a first data encryption operation performed on the initial data retrieved from the primary memory system to produce the intermediate data, and wherein the at least one final data transform operation includes a second data encryption operation performed on the intermediate data produced from the first data encryption operation to provide the final data.

12. The IHS of claim 7, wherein the at least one intermediate data transform operation includes a first data compression operation performed on the initial data retrieved from the primary memory system to produce the intermediate data, and wherein the at least one final data transform operation includes a second data compression operation performed on the intermediate data produced from the first data compression operation to provide the final data.

13. The IHS of claim 7, wherein the data mover engine is configured to:
    perform a data movement operation that includes moving data from a source memory location in the primary memory system to a destination memory location in the primary memory system, wherein the data movement operation includes at least one of a read operation, a write operation, or a copy operation to relieve the processing system from having to use processing cycles to perform the at least one of the read operation, the write operation, or the copy operation.

14. A method for providing pipelined data transformation via a data mover system, comprising:
    receiving, by a data mover device from a processing system, a data transform configuration that includes data mover instructions that were converted from analogous processing system instructions and that are configured to cause the processing system to perform one or more pipelined data transform operations when the data mover device is not available;
    configuring, using the data mover instructions, the data mover device to perform the one or more pipelined data transform operations;
    reading, via the network by the data mover device from at least one memory location included in a network-connected memory fabric provided by a memory system coupled to the processing system using a copy engine that is provisioned for each at least one memory location using the data mover instructions, initial data;
    performing, by the data mover device via at least one first data mover element that is included in the data mover device, that is provisioned using the analogous data mover instructions, and without utilizing resources of the processing system, at least one intermediate data transform operation on the initial data in order to produce intermediate data;
    outputting, by the data mover device via the at least one first data mover element, the intermediate data to provide an input to at least one second data mover element that is included in the data mover device and that is provisioned using the data mover instructions to perform at least one final data transform operation on the intermediate data in order to produce final data;
    performing, by the data mover device via the at least one second data mover element using the analogous data mover instructions and without utilizing resources of the processing system, the at least one final data transform operation on the intermediate data in order to produce the final data; and
    writing, over the network by the data mover device to at least one memory location included in the network-connected memory fabric and using a second level function engine provisioned using the data mover instructions, the final data.

15. The method of claim 14, wherein the data transform configuration includes a single descriptor that configures the data mover device to perform multiple read operations from different memory locations in the network-connected memory fabric in order to read the initial data.

16. The method of claim 14, further comprising:
    storing, by the data mover device, the intermediate data prior to performing the at least one final data transform operation.

17. The method of claim 14, wherein the at least one intermediate data transform operation includes a memory compare operation that compares the initial data retrieved from different memory locations in the network-connected memory fabric, and wherein the at least one final data transform operation includes a data difference operation that identifies differences in the intermediate data produced from the comparison performed in the memory compare operation to provide the final data.

18. The method of claim 14, wherein the at least one intermediate data transform operation includes a first data encryption operation performed on the initial data retrieved from the network-connected memory fabric to produce the intermediate data, and wherein the at least one final data transform operation includes a second data encryption operation performed on the intermediate data produced from the first data encryption operation to provide the final data.

19. The method of claim 14, wherein the at least one intermediate data transform operation includes a first data compression operation performed on the initial data retrieved from the network-connected memory fabric to produce the intermediate data, and wherein the at least one final data transform operation includes a second data compression operation performed on the intermediate data produced from the first data compression operation to provide the final data.

20. The method of claim 14, further comprising:
    performing, by the data mover device, a data movement operation that includes moving data from a source memory location in the primary memory system to a destination memory location in the primary memory system, wherein the data movement operation includes at least one of a read operation, a write operation, or a copy operation to relieve the processing system from having to use processing cycles to perform the at least one of the read operation, the write operation, or the copy operation.

* * * * *

UNITED STATES PATENT AND TRADEMARK OFFICE
CERTIFICATE OF CORRECTION

PATENT NO. : 11,157,423 B2  
APPLICATION NO. : 16/401913  
DATED : October 26, 2021  
INVENTOR(S) : Shyamkumar T. Iyer Page 1 of 1

It is certified that error appears in the above-identified patent and that said Letters Patent is hereby corrected as shown below:

In the Claims

Claim 14, Column 15, Line 55, delete "analogous";

Claim 14, Column 16, Line 6, delete "analogous".

Signed and Sealed this  
Eleventh Day of January, 2022

Drew Hirshfeld  
*Performing the Functions and Duties of the*  
*Under Secretary of Commerce for Intellectual Property and*  
*Director of the United States Patent and Trademark Office*